United States Patent [19]

Stein et al.

[11] Patent Number: 5,904,988
[45] Date of Patent: May 18, 1999

[54] SPRAYABLE, CONDENSATION CURABLE SILICONE FOUL RELEASE COATINGS AND ARTICLES COATED THEREWITH

[75] Inventors: Judith Stein; Timothy Brydon Burnell, both of Schenectady, N.Y.

[73] Assignee: General Electric Company, Schenectady, N.Y.

[21] Appl. No.: 08/862,996

[22] Filed: May 27, 1997

[51] Int. Cl.$^6$ .................................. B32B 9/04; C08J 5/54
[52] U.S. Cl. .................... 428/447; 524/731; 524/493; 524/837; 523/213
[58] Field of Search ..................................... 524/493, 731, 524/837; 523/213; 428/447

[56] References Cited

U.S. PATENT DOCUMENTS 5,563,210  10/1996  Donatelli et al. ....................... 524/731

FOREIGN PATENT DOCUMENTS 2287248  2/1995  United Kingdom .

*Primary Examiner*—Robert Dawson
*Assistant Examiner*—Caixia Lu-Rutt
*Attorney, Agent, or Firm*—Noreen C. Johnson; Douglas E. Stoner

[57] ABSTRACT

Room temperature vulcanizable coating compositions, useful as anti-fouling coatings for marine structures such as ships, are prepared by a method comprising the steps of first blending a particulate reinforcing filler such as silica with a non-reactive polyorganosiloxane oil under high shear conditions, and subsequently combining the resulting masterbatch with at least one reactive polyorganosiloxane having a relatively low viscosity, a condensation catalyst and a crosslinking agent. The resulting compositions are sprayable in the absence of solvents, although solvents may be added if desired.

20 Claims, No Drawings

SPRAYABLE, CONDENSATION CURABLE SILICONE FOUL RELEASE COATINGS AND ARTICLES COATED THEREWITH

This invention was made with government support under Contract No. N61533-93-C-0062 awarded by the Department of the Navy. The government has certain rights in this invention.

BACKGROUND OF THE INVENTION

This invention relates to foul release coatings and articles coated therewith. More particularly, it relates to sprayable foul release coatings which may be employed without undue environmental harm.

As poetically stated in U.S. Pat. No. 4,861,670, "Marine fouling due to pernicious and pestiferous sessile organisms is a problem which reaches from ancient times to the present." In more simple terms, a perennial major aggravation to shippers and users of marine equipment in contact with water is the tendency of such equipment to become encrusted with various varieties of wildlife, as illustrated by barnacles and zebra mussels.

Said patent goes on to describe in considerable detail the types of treatments that have been employed, starting as early as 1854, to minimize marine fouling. Treatment materials have included compounds of such metals as copper, tin, arsenic, mercury, zinc, lead, antimony, silver and iron, as well as toxic organic materials such as strychnine and atropine. With increasing interest in the state of the environment, the use of such materials has been strongly discouraged.

More recently, polyorganosiloxanes (hereinafter sometimes designated "silicones" for brevity) have been found useful as anti-fouling coatings. They include condensation cured room temperature vulcanizable (hereinafter sometimes "RTV") compositions comprising silica as a filler in combination with silanol-terminated or di- or trialkoxy-terminated silicones, catalysts and crosslinking agents. These condensation cured compositions are typically thixotropic and are thus incapable as prepared of application by spraying. They can generally only be conveniently applied neat by such time-honored but tedious methods as brushing or roller coating.

The only potential way to make such materials sprayable is to dilute them with solvents, typically volatile organic compounds such as hydrocarbons which present their own environmental hazards. In any event, many localities have enacted legislation limiting the proportions of volatile organic compounds in such compositions to values in the parts-per-million range, far below those that would be necessary for them to serve as solvents.

British published application 2,287,248 and copending, commonly owned application Ser. No. 08/646,646 disclose silica-silicone oil masterbatches and their use in the formulation of room temperature vulcanizable silicone compositions. Said compositions as disclosed therein are, however, very viscous, having viscosities under ambient conditions as disclosed of at least 24,000 centipoise and often much higher. Thus, they similarly cannot be applied by spraying without employment of solvents.

Thus, the development of sprayable, environmentally harmless condensation curable silicone foul release coating compositions remains a concern.

SUMMARY OF THE INVENTION

The present invention is based on the discovery that blending of silica filler with silicone materials in a specific order and under specific conditions can produce a sprayable condensation curable foul release coating composition, even in the absence of solvent. This is unexpected, since blending of the same chemically active constituents under other conditions produces a thixotropic composition which cannot be sprayed without dilution with solvent.

One aspect of the invention is sprayable room temperature vulcanizable coating compositions prepared by a method comprising the steps of:

(I) blending a particulate reinforcing filler with a non-reactive polyorganosiloxane oil under high shear conditions sufficient to reduce the filler particles to an average size less than about 300 nm in a time period of less than about 24 hours, to form a filler-oil masterbatch;

(II) combining said masterbatch with at least one reactive polyorganosiloxane having a viscosity under ambient temperature and pressure conditions up to about 6,000 centipoise and effective amounts of at least one condensation catalyst and at least one crosslinking agent to form a coating composition having a viscosity under ambient temperature and pressure conditions up to about 10,000 centipoise.

Another aspect of the invention is articles comprising a marine structure coated with an anti-fouling coating which is the condensation cured reaction product of the composition defined hereinabove.

DETAILED DESCRIPTION; PREFERRED EMBODIMENTS

Many of the constituents of the compositions of this invention are similar or identical to those disclosed in the aforementioned British patent application 2,287,248. The disclosure of said application is incorporated by reference herein.

In step I of the method of producing the compositions of this invention, a particulate reinforcing filler is blended with a non-reactive polyorganosiloxane. Typical reinforcing fillers are commercially available in the form of relatively large aggregated particles, typically having an average size significantly greater than 300 nm. The preferred fillers are the silica fillers, including fumed silica and precipitated silica. These two forms of silica have surface areas in the ranges of 90–325 and 80–150 m²/g, respectively.

Also employed in step I is a non-reactive silicone oil. The preferred silicone oils are polydiorganosiloxanes, typically having the formula

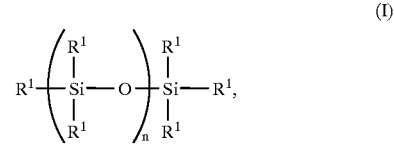

(I)

wherein each $R^1$ is an alkyl radical, preferably methyl, and n has an average value such that the kinematic viscosity of the silicone oil is in the range of about 30–5,000 and preferably about 40–750 centipoise.

The mixture of step I also preferably contains a treating agent for the filler, typically one which will render a silica filler hydrophobic. Typical treating agents include cyclic silicones such as cyclooctamethyltetrasiloxane and acyclic and cyclic organosilazanes such as hexamethyldisilazane, 1,3-divinyl-1,1,3,3-tetramethyidisilazane, hexamethylcyclotrisilazane, octamethylcyclotetrasilazane and mixtures of these. Hexamethyidisilazane is often most preferred.

When the presence of water is necessary for hydrolysis of reactive silicones, as described hereinafter, water in an appropriate proportion may be incorporated in the mixture employed in step I.

The proportions of the components employed in step I may be varied widely. The amount of filler is generally about 5–200 parts and preferably about 10–150 parts by weight per 100 parts of non-reactive silicone oil. Treating agent, when present, is most often in the amount of about 0.1–10% and especially about 0.5–5% by weight, based on filler and non-reactive silicone oil combined.

The above-described components are blended under high shear conditions, sufficient to reduce the filler particles to an average size less than about 300 nm, typically in the range of about 100–300 and especially about 100–200 nm, in a blending period of less than about 24 and preferably less than about 14 hours. Art-recognized mixers such as Drais mixers, planetary mixers and sigma-bladed dough mixers may be employed for this purpose. The product of the mixing operation is a masterbatch whose employment in the preparation of the foul release coating has significant advantages, particularly with regard to viscosity, as more fully explained hereinafter.

In step II, the masterbatch prepared in step I is combined with the other constituents of an RTV composition. Said other constituents include at least one reactive silicone, at least one condensation catalyst and at least one crosslinking agent.

The reactive silicone is most often a polydialkylsiloxane, typically of the formula (II)

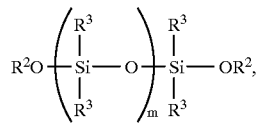

wherein each $R^2$ is hydrogen or (III)

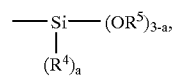

each $R^3$ is independently a hydrocarbon or fluorinated hydrocarbon radical, each $R^4$ and $R^5$ is a hydrocarbon radical, a is 0 or 1 and m has a value such that the viscosity of said reactive silicone under ambient temperature and pressure conditions is up to about 6,000 centipoise. Illustrative hydrocarbon radicals are $C_{1-20}$ alkyl, $C_{6-20}$ aryl and alkaryl, vinyl, isopropenyl, allyl, butenyl and hexenyl, with $C_{1-4}$ alkyl and especially methyl being preferred. An illustrative fluorinated hydrocarbon radical is 3,3,3-trifluoropropyl. Most often, each $R^3$, $R^5$ and $R^6$ is alkyl and preferably methyl.

It is within the scope of the invention to employ two or more reactive silicones, differing in average molecular weight. This may afford a bimodal composition having performance advantages over a simple monomodal composition.

The condensation catalysts employed in step II may be any of those known to be useful for promoting condensation curing of an RTV material. Suitable catalysts include tin, zirconium and titanium compounds as illustrated by dibutyltin dilaurate, dibutyltin diacetate, dibutyltin methoxide, dibutyltin bis(acetylacetonate), 1,3-dioxypropanetitanium bis(acetylacetonate), titanium naphthenate tetrabutyl titanate and zirconium octanoate. Various salts of organic acids with such metals as lead, iron, cobalt, manganese, zinc, antimony and bismuth may also be employed, as may non-metallic catalysts such as hexylammonium acetate and benzyltrimethylammonium acetate.

For most purposes, the tin and titanium compounds are preferred. In situations where tin may have an undesirable effect on aquatic life, titanium compounds are preferred.

As crosslinking agents, trifunctional (T) and tetrafunctional (Q) silanes are useful, the term "functional" in this context denoting the presence of a silicon-oxygen bond. They include such compounds as methyltrimethoxysilane, methyltriethoxysilane, 2-cyanoethyltrimethoxysilane, methyltriacetoxysilane, tetraethyl silicate and tetra-n-propyl silicate. The Q-functional compounds, i.e., tetraalkyl silicates, are often preferred.

For the most part, the proportion of reactive silicone introduced in step II is sufficient to afford a composition containing about 10–20% by weight of reinforcing agent. Catalysts and crosslinkers are generally present in the amounts of about 0.001–2.5% and about 0.25–5.0% by weight respectively, based on reactive silicone.

The compositions of this invention may contain other constituents, which may as appropriate be added in the preparation of the masterbatch or at a later stage. They may include extending (non-reinforcing) fillers such as titanium dioxide, lithopone, zinc oxide, zirconium silicate, iron oxides, diatomaceous earth, calcium carbonate, glass fibers, magnesium oxide, chromic oxide, zirconium oxide, aluminum oxide, crushed quartz, calcined clay, asbestos, carbon, graphite, cork, cotton and synthetic fibers; glass fibers are often preferred since they can improve abrasion resistance. Also included are water, particularly when $R^2$ in the reactive silicone is an alkyl radical whereupon about 0.01–0.5% water by weight based on reactive silicone may be employed to hydrolyze said silicone to a silanol-terminated material; wetting agents such as hexamethyidisiloxane, most often in the amount of about 5–10% by weight based on the total of constituents recited in steps I–II; and solvents such as aliphatic hydrocarbons, typically in the amount of about 5–15% by weight based on the total of constituents recited in steps I–II, when the use of a solvent-free sprayable composition is not necessary.

Step II may be performed in any mixture capable of thoroughly blending the constituents of the mixture. In general, employment of a high shear blender in this step is not required.

The compositions of the invention may be one-part or two-part RTV compositions. For the most part, two-part compositions are preferred when $R^2$ in the reactive silicone is hydrogen, since curing is then initiated promptly upon introduction of the catalyst and crosslinking agent. When $R^2$ has formula III, or when a scavenger is added as known in the art, there may be a substantial induction period before curing takes place, making it possible to blend all constituents and obtain a mixture having substantial shelf life when maintained out of contact with water, including atmospheric moisture.

The marine structures in the articles of the invention are often ships' hulls. However, other underwater articles such as liquid collecting and discharge pipes, dry dock equipment and the like are included. Suitable materials therefor include metals such as iron and aluminum and resinous materials such as fiber-reinforced thermoplastic or thermoset resins.

A principal unexpected feature of the compositions of this invention is their sprayability even in the absence of solvents. For the purposes of the invention, a composition is considered sprayable if its viscosity is no greater than about 10,000 centipoise under ambient temperature and pressure conditions. When a silica material identical to that employed in step I is incorporated directly in an RTV composition rather than formulating it as a masterbatch as described herein, the viscosity of the resulting composition is much too high for it to be sprayed without dilution with a solvent.

Application by spraying of the compositions of the invention is typically preceded by the application of conventional pretreatment layers. These may include, for example, primers such as epoxy mist coats and tie-layers comprising polyorganosiloxanes and toughening components.

The invention is illustrated by the following examples. All parts are by weight.

EXAMPLE 1

A high-shear Drais mixer was charged with 56.6 parts of a polydimethylsiloxane oil having a viscosity of 500 centipoise, 5.67 parts of water and 6.0 parts of hexamethyidisilazane. This mixture was blended for 10 minutes in a nitrogen atmosphere, after which 37.43 parts of hydrophilic fumed silica was added. The mixture was heated at 110° C. until an increase in the amperage of the mixer motor was observed, after which full vacuum was applied with heating to 140° C. for 1 hour. The vacuum was then broken, the temperature reduced to 70° C. and 10 parts of a polydimethylsiloxane oil having a viscosity of 50 centipoise was added. The desired masterbatch was obtained upon mixing for an additional 20 minutes.

A blend of 40 parts of the masterbatch, 60 parts of a silanol-stopped polydimethylsiloxane having a viscosity of 3500 centipoise, 6 parts of tetra-n-propyl silicate, 1 part of a silanol-stopped polydimethylsiloxane oligomer having a degree of polymerization of 7 and 0.5 part of di-n-butyltin diacetate was applied by spraying to a metal surface which had been treated with a commercially available epoxy anti-corrosion coating, mist coat and tie-layer. Upon exposure to underwater conditions for 29 months, the treated surface was essentially free from hard fouling by organisms.

EXAMPLE 2

The composition of Example 1 was combined with 5% of a vinyl-terminated polydimethylsiloxane having a viscosity of 3,500 centipoise, and sprayed on concrete surfaces of a power plant after application of an epoxy anti-corrosion coating, mist coat and tie-layer. After exposure to underwater conditions for one year, virtually no hard macrofouling organisms were present and the performance of the composition of the invention was superior to that of a commercially available foul release coating.

EXAMPLE 3

The composition of Example 1 was combined with 10% by weight naphtha as a solvent. The resulting solution was applied to the hull of an aircraft carrier, following a commercially available epoxy anti-corrosion coating, mist coat and tie-layer.

EXAMPLE 4

The composition of Example 1 was combined with 6.5% by weight hexamethyidisiloxane and 5% of a vinyl-terminated polydimethylsiloxane having a viscosity of 3,500 centipoise. The resulting composition was applied by spraying to a submarine surface, following a commercially available epoxy mist coat and a tie-layer.

EXAMPLE 5

The procedure of Example 1 is repeated, substituting for the silanol-stopped polydimethylsiloxane an equivalent amount of a corresponding methyldimethoxysilyl-stopped silicone. A product having similar properties is obtained.

What is claimed is:

1. A sprayable room temperature vulcanizable coating composition prepared by a method comprising the steps of:
   (I) blending a particulate reinforcing filler with a non-reactive polyorganosiloxane oil under high shear conditions sufficient to reduce the filler particles to an average size less than about 300 nm in a time period of less than about 24 hours, to form a filler-oil masterbatch;
   (II) combining said masterbatch with at least one reactive polyorganosiloxane having a viscosity under ambient temperature and pressure conditions up to about 6,000 centipoise and effective amounts of at least one condensation catalyst and at least one crosslinking agent to form a coating composition having a viscosity under ambient temperature and pressure conditions up to about 10,000 centipoise.

2. A composition according to claim 1 wherein the filler is fumed silica or precipitated silica.

3. A composition according to claim 2 wherein the amount of filler is about 10–150 parts by weight per 100 parts of non-reactive silicone oil.

4. A composition according to claim 2 wherein the non-reactive polyorganosiloxane oil has the formula

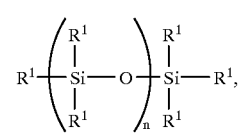

(I)

wherein each $R^1$ is an alkyl radical and n has an average value such that the kinematic viscosity of said silicone oil is in the range of about 30–1,000 centipoise.

5. A composition according to claim 4 wherein each $R^1$ is methyl.

6. A composition according to claim 2 wherein a treating agent for said filler is employed in step I.

7. A composition according to claim 6 wherein the treating agent is hexamethyidisilazane.

8. A composition according to claim 6 wherein the amount of treating agent is about 0.5–5% by weight based on filler and non-reactive silicone oil combined.

9. A composition according to claim 2 wherein the reactive silicone is a polydialkylsiloxane having the formula

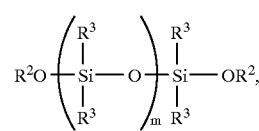

(II)

wherein each $R^2$ is hydrogen or

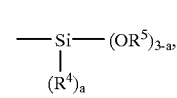

(III)

each $R^3$ is independently a hydrocarbon or fluorinated hydrocarbon radical, each $R^4$ and $R^5$ is a hydrocarbon radical, a is 0 or 1 and m has a value such that the viscosity of said reactive silicone under ambient temperature and pressure conditions is up to about 6,000 centipoise.

10. A composition according to claim 9 wherein each $R^3$ is methyl.

11. A composition according to claim 10 wherein each $R^2$ is hydrogen.

12. A composition according to claim 10 wherein each $R^2$ is methyl and water is also present in said composition.

13. A composition according to claim 2 wherein the condensation catalyst is a tin, zirconium or titanium compound.

14. A composition according to claim 2 wherein crosslinking agent is a trifunctional or tetrafunctional silane.

15. A composition according to claim 14 wherein the crosslinking agent is a tetraalkyl silicate.

16. An article comprising a marine structure coated with an anti-fouling coating which is the condensation cured reaction product of a sprayable room temperature vulcanizable coating composition prepared by a method comprising the steps of:
  (I) blending a particulate reinforcing filler with a non-reactive polyorganosiloxane oil under high shear conditions sufficient to reduce the filler particles to an average size less than about 300 nm in a time period of less than about 24 hours, to form a filler-oil masterbatch;
  (II) combining said masterbatch with at least one reactive polyorganosiloxane having a viscosity under ambient temperature and pressure conditions up to about 6,000 centipoise and effective amounts of at least one condensation catalyst and at least one crosslinking agent to form a coating composition having a viscosity under ambient temperature and pressure conditions up to about 10,000 centipoise.

17. An article according to claim 16 wherein the marine structure is a ship's hull.

18. An article according to claim 16 wherein the non-reactive polyorganosiloxane oil has the formula

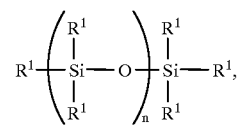
(I)

wherein each $R^1$ is methyl and n has an average value such that the kinematic viscosity of said silicone oil is in the range of about 30–1,000 centipoise.

19. An article according to claim 16 wherein the reactive silicone is a polydialkylsiloxane having the formula

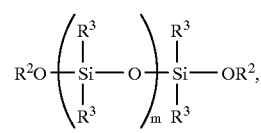
(II)

wherein each $R^2$ is hydrogen or

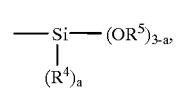
(III)

each $R^3$, $R^4$ and $R^5$ is methyl, a is 0 or 1 and m has a value such that the viscosity of said reactive silicone under ambient temperature and pressure conditions is up to about 6,000 centipoise.

20. An article according to claim 16 wherein the condensation catalyst is a tin, zirconium or titanium compound and the crosslinking agent is a tetraalkyl silicate.

* * * * *